(12) United States Patent
Newman

(10) Patent No.: US 7,043,904 B2
(45) Date of Patent: May 16, 2006

(54) ELECTRICAL ENERGY FROM LIVE LOADS

(76) Inventor: Edwin Newman, 11038 Camarillo St. Unit #3, Toluca Lake, CA (US) 91602

(*) Notice: Subject to any disclaimer, the term of this patent is extended or adjusted under 35 U.S.C. 154(b) by 0 days.

(21) Appl. No.: 11/090,568

(22) Filed: Mar. 28, 2005

(65) Prior Publication Data

US 2005/0193728 A1 Sep. 8, 2005

Related U.S. Application Data

(63) Continuation-in-part of application No. 10/872,596, filed on Jun. 22, 2004, now abandoned, and a continuation-in-part of application No. 10/838,737, filed on May 5, 2004, now abandoned, and a continuation-in-part of application No. 10/792,148, filed on Mar. 4, 2004, now abandoned, and a continuation-in-part of application No. 10/742,983, filed on Dec. 23, 2003, now abandoned.

(51) Int. Cl.
*F16D 31/02* (2006.01)

(52) U.S. Cl. ............... 60/398; 290/43; 290/53

(58) Field of Classification Search .............. 60/398, 60/502; 91/422; 92/181 R, 181 P; 74/47, 74/51; 290/43, 53, 54, 55
See application file for complete search history.

(56) References Cited

U.S. PATENT DOCUMENTS

| | | | | |
|---|---|---|---|---|
| 32,455 A | * | 5/1861 | Shaw | 60/39.63 |
| 170,813 A | * | 12/1875 | Burger | 123/294 |
| 610,790 A | * | 9/1898 | Beckers | 60/398 |
| 1,258,368 A | | 3/1918 | Smith | |
| 3,991,574 A | * | 11/1976 | Frazier | 60/645 |
| 4,004,422 A | | 1/1977 | Le Van | |
| 4,095,423 A | * | 6/1978 | Gorlov | 60/398 |
| 4,222,238 A | * | 9/1980 | McCulloch | 60/398 |
| 4,306,414 A | * | 12/1981 | Kuhns | 60/510 |
| 4,932,313 A | * | 6/1990 | Gutknecht | 92/181 R |
| 5,709,419 A | | 1/1998 | Roskey | 290/55 |
| 5,977,649 A | * | 11/1999 | Dahill | 290/55 |
| 6,376,925 B1 | | 4/2002 | Galich | 290/1 R |
| 6,450,732 B1 | * | 9/2002 | Boccotti | 290/53 |
| 6,568,181 B1 | | 5/2003 | Hassard et al. | 60/398 |

(Continued)

FOREIGN PATENT DOCUMENTS

GB     20093228 A * 6/1979

(Continued)

OTHER PUBLICATIONS

U.S. Appl. No. 10/792,148 Utility Application Mar. 4, 2004.

(Continued)

*Primary Examiner*—Thomas E. Lazo

(57) ABSTRACT

A group of devices and machines for converting the mechanical energy of live loads into electricity. A generator is operated by gears which in their turn are operated by a Bourdon tube or similar-acting device fed by working fluid in a pipe from a reservoir. The reservoir walls are impacted by a choice of the rolling weight of a motor vehicle, the bending force on some object and/or by a decompressing force on the working fluid. The invention is applied to roadways, buildings, sailboats, cars with internal combustion engines, elevators, ships and bridges. If the varying impacts are caused by wind or subsurface ocean currents a new type of diverging nozzle is used to magnify pressure input. By using the invention pressure waves are used to transfer energy with minimal movement of working fluid, minimizing friction and other losses.

8 Claims, 15 Drawing Sheets

U.S. PATENT DOCUMENTS 6,781,253 B1  8/2004  Newman .................... 290/53

FOREIGN PATENT DOCUMENTS

WO        WO 3033824 A1 *  4/2003

OTHER PUBLICATIONS

U.S. Appl. No. 10/838,737 Utility Application May 5, 2004.
U.S. Appl. No. 10/872,596 Uility Application Jun. 22, 2004.

* cited by examiner

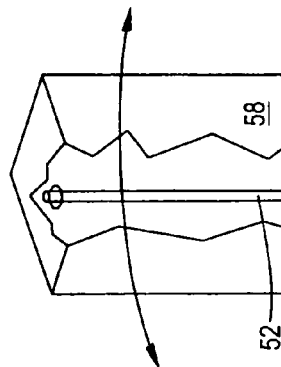
FIG. 7a.
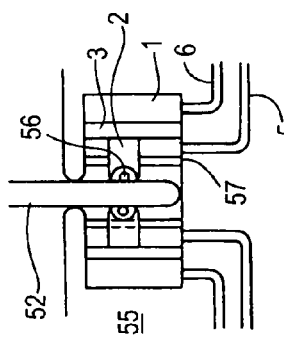
FIG. 8.
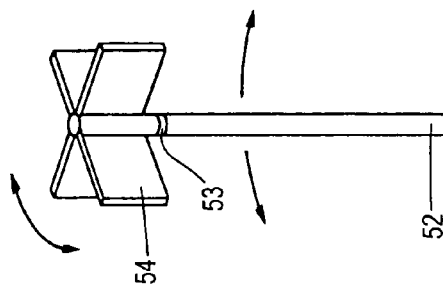
FIG. 7.

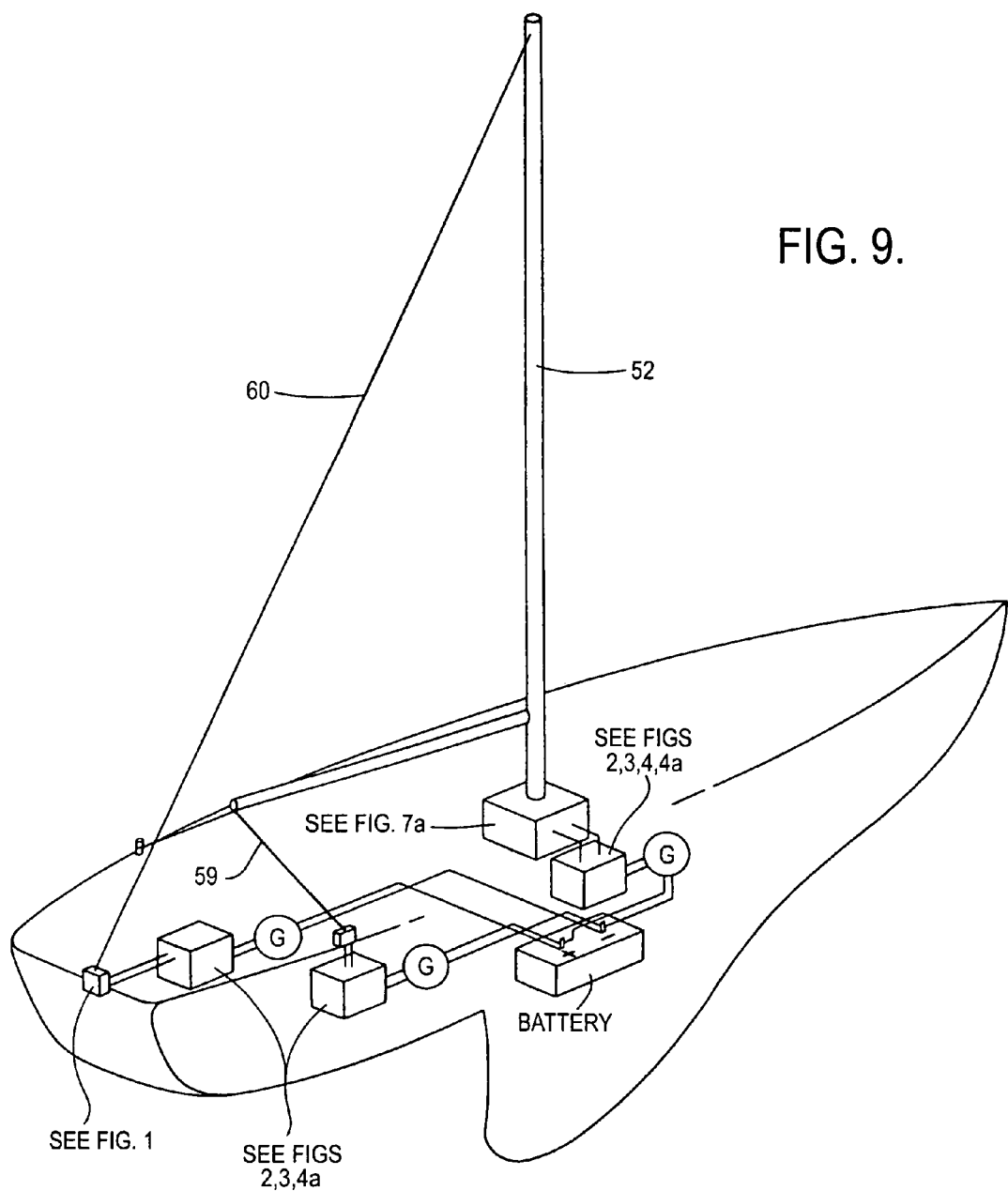

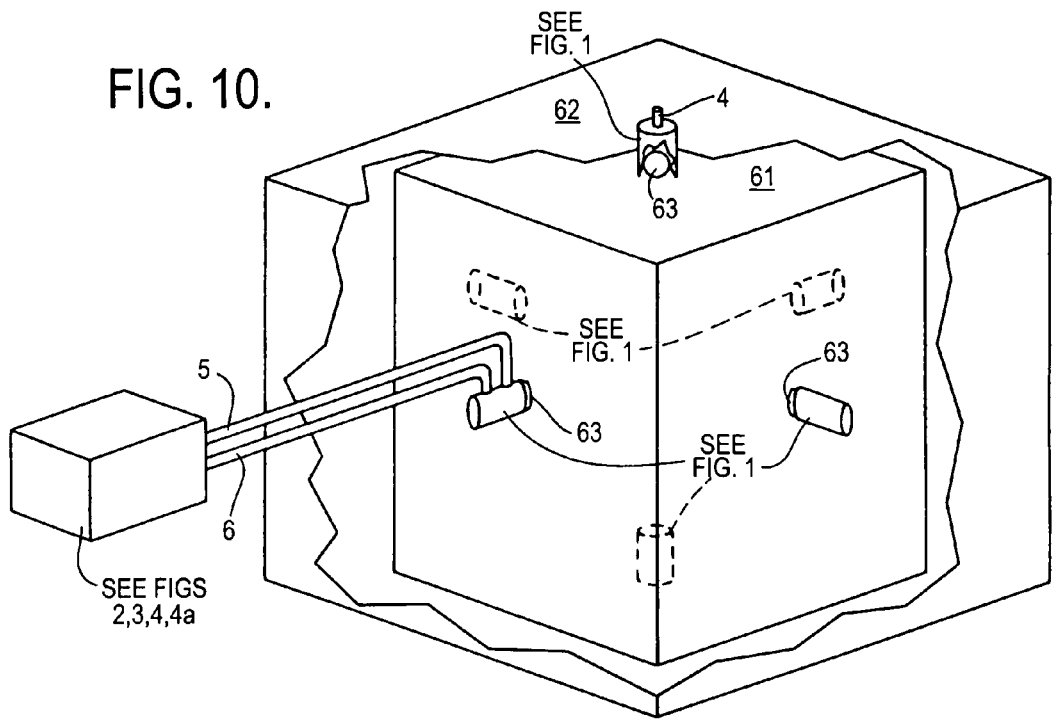
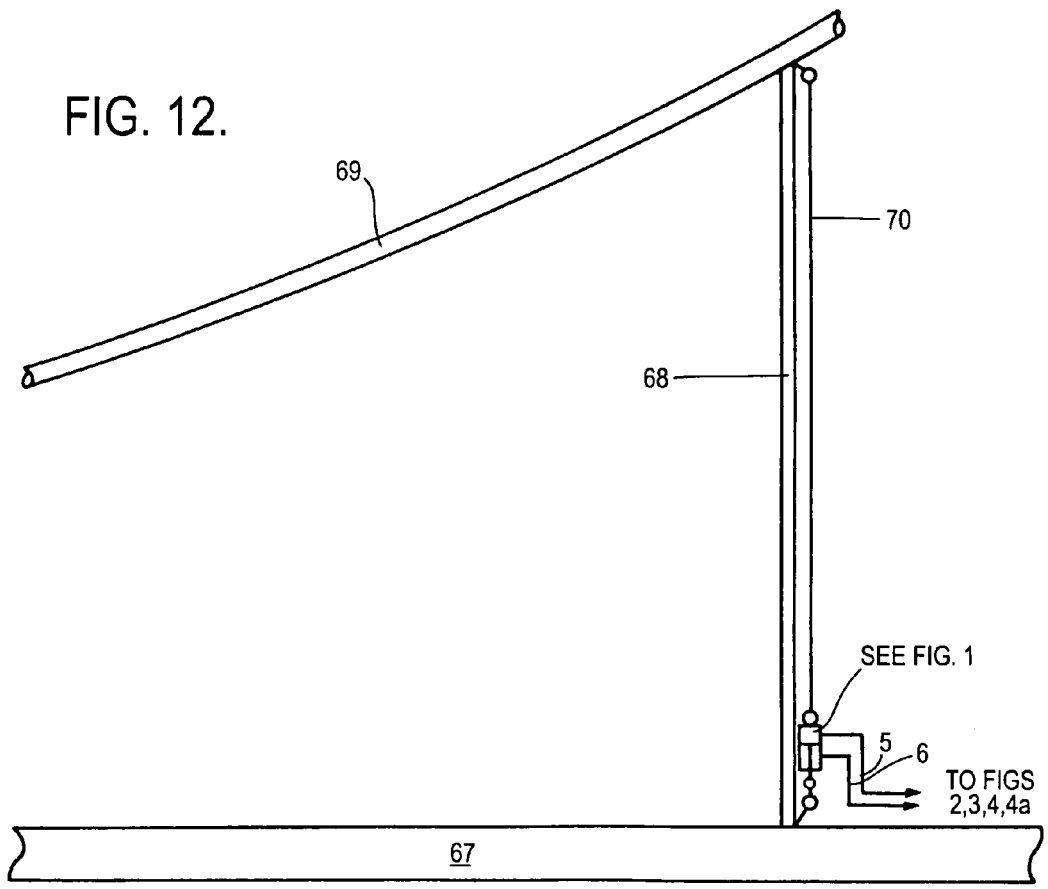

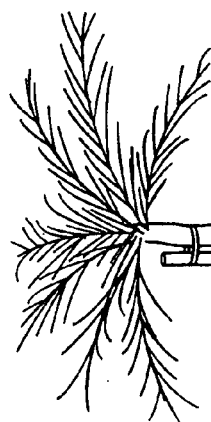
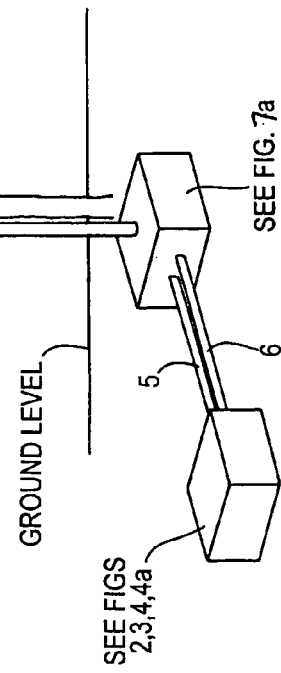
FIG. 18.
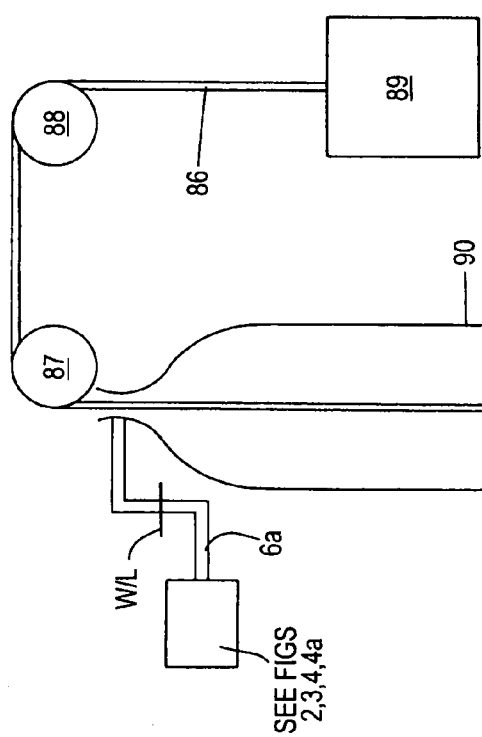
FIG. 14.

ELECTRICAL ENERGY FROM LIVE LOADS

Prior applications Ser. No. 10/792,148 filed Mar. 4, 2004, Ser. No. 10/838,737 filed May 5, 2004 which is a Continuation-In-Part of application Ser. No. 10/742,983, filed Dec. 23, 2003, and Ser. No. 10/872,596 filed Jun. 22, 2004 are abandoned. This application is a Continuation-In-Part of the above applications.

BACKGROUND

1. Field of the Invention

This invention concerns converting pressure variations into electrical energy through the agency of hydraulic and/or mechanical devices and more particularly concerns the various causes or pressure variations and how their energy may be more efficiently converted into electrical energy.

2. Prior Art

Piezoelectric inventions convert pressure variations directly into electrical energy but their efficiency is very low and charging piezoelectric material is expensive.

Bourdon tubes that transmit power have been proposed. See my U.S. Pat. No. 6,781,253. But the use of the invention is restricted to surface and subsurface ocean wave energy or the input. Wind and subsurface ocean currents are examples of types or energy input for this invention. They possess mechanical energy. The two relevant components of mechanical energy are pressure energy and kinetic energy. Up to now only some few efforts have been made to convert the pressure-energy o these two fluids into electrical energy. Yet the extractable pressure energy of these two fluids as they naturally occur is far greater than their extractable kinetic energy. Hydroelectric turbine generators are a prime example of devices which convert pressure energy into electrical energy. A pressure head is artificially built up in differentiation with the pressure of the surrounding atmosphere. Theoretical power output is calculated as this pressure difference multiplied by the rate of flow.

The relevant technology for converting the pressure energy of the wind into electrical energy is U.S. Pat. No. 5,709,419 to Roskey. Pressure energy is converted to kinetic energy by using a Venturi flume with the kinetic energy compounded with the use of a manifold. The manifold lies outside the Venturi flume so the advantage of using a manifold is minimized since pipe friction can be very great unless large pipes are used.

For converting the pressure energy of subsurface ocean currents into electrical energy the U.S. patent most relevant to this invention is U.S. Pat. No. 6,568,181 to Hassard et. al. Here an airflow is drawn through an air turbine ashore from a pipe to an offshore Venturi tube's throat, as may be observed with a manometer. The speed of the current as it is accellerated through the throat determines the speed of the airflow. But to avoid large energy glosses through the airpipe due to friction a large and expensive pipe is needed.

SUMMARY OF THE INVENTION

A live load is defined in this invention as any load causing variations in pressure through time on the walls of a chamber (a closed pipe) of working fluid. These walls may be impacted through the action of wind, waves, ocean currents, fuel explosion, or moving an automobile over the chamber directly or indirectly, among other causes. Concerning wind and wave action, specific structures are presented to improve the efficiency of converting pressure energy from these sources into electrical energy in a more efficient manner.

More specifically these structures as they relate to wind comprise a tear-shaped object oriented so its blunt end is made to face the oncoming current. The object is in two separate portions, the division being on a plane through the object's widest diameter each called an anterior dome and a posterior cone. There is sufficient structure to unite the separate parts of the object together. Through the center of the anterior dome is a hole and near this hole is a tube leading to a pressure-energy converting apparatus elsewhere. As wind flows past this tear-drop shaped object wind tends to be drawn through this hole at high velocity and out between the rims of the anterior and posterior portions of the object at the prevailing current velocity due to lifting force.

This object is a form of diverging nozzle arranged to reduce pressure in the tube to make an energy sink. The energy used to make the sink is converted into electrical energy by a Bourdon tube or similar-acting structure geared to be made to operate an electric generator. The described object is modified for use of subsurface ocean currents as a working fluid by making the posterior portion like the anterior portion. Thus the invention need not be revolved to face an oppositely flowing current and has no moving parts below the waterline. Ashore, the tube is made conduct pressure to or from the Bourdon tube or similar-acting structure. The action of the Bourdon tube or similar-acting structure is made to operate a gear transmission add electric generator.

If the walls of the reservoir are to be impacted by the action of ocean surface or internal waves then the invention of U.S. Pat. No. 6,781,253 is used, but substituting for a Bourdon tube a similar-acting structure.

The invention is also applied to operate internal combustion engines and elevators more efficiently. In one embodiment a Bourdon tube or similar-acting structure is operated to produce electric power when a piston of an internal combustion engine is made to move. This movement alternately pressurizes and depressurizes a body of working fluid such as water which is connected to a Bourdon tube or similar-acting structure. The body of water is in the form of a completely enclosed filled chamber of water. One wall is moveable but barely is moved because the bulk modulus of elasticity of water is very high. The moveable wall also defines a wall of a combustion chamber. As the wall barely moves the operation of the engine is barely impaired. The Bourdon tube or similar-acting structure is made to drive gears, ratchets and pawls to operate an electric generator. In another embodiment Bourdon tube or similar acting structure is used to produce electric power when the movement of a piston within a piston cylinder causes a flow of air in front of the piston and behind it. An inlet tube for a Bourdon tube or similar acting structure is led through the wall of the piston cylinder. The flow of air through the piston cylinder caused by the movement of the piston causes a reduction of pressure in the Bourdon tube or similar-acting structure, due to the Bernouilli Effect. The pressure in the Bourdon tube or similar-acting structure is made to vary when the piston is made to move back and forth in it's cylinder.

The first aim of the invention is to show how to convert pressure energy into electrical energy. The new structures introduced move minimally, reducing friction loss and increasing system efficiency as will be explained in each preferred embodiment.

The second aim of the invention is to utilize pressure energy as much as possible to convert the energy in live loads into electricity. Pressure energy is at present underutilized.

BRIEF DESCRIPTION OF THE DRAWINGS

FIG. 7, is a perspective view showing how a pole may be used as a lever to transmit pressure variations to a Bourdon tube or equivalent.

FIG. 7a is a cross-sectional view of a device as in FIG. 2 as it is applied to the invention as it is shown in FIG. 7.

FIG. 8 is a perspective view showing how a building may be used with the invention to produce electricity.

FIG. 9 is a perspective view showing how a sailboat may be used with the invention to produce electricity.

FIG. 10 is a perspective view showing how impacts to sore mass may be used to generate electricity.

FIG. 12 is a perspective view showing how a bride may be used with the invention to produce electricity.

FIG. 14 is a cross-sectional view showing how an elevator may be used with the invention to produce-electricity.

FIG. 18 shows how a tree support may be used to generate electricity according to the invention.

BASIC STRUCTURES OF THE INVENTION

Figure 1:
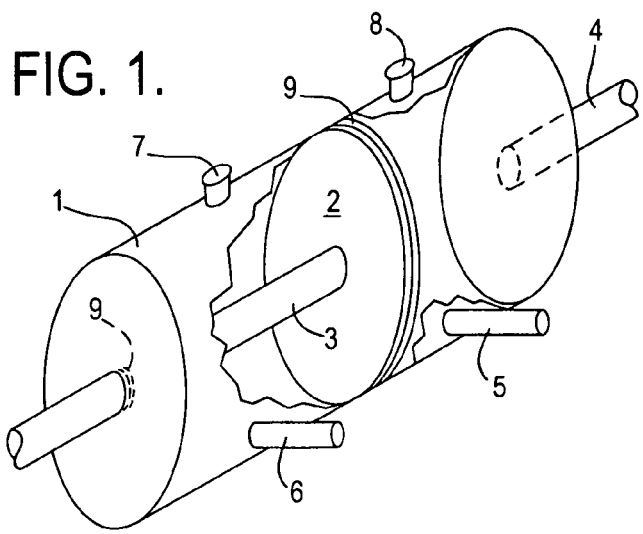
FIG. 1 is a perspective view of a device for transmitting live loads to a Bourdon tube or similar-acting structure.

Turning to FIG. 1 we see a hollow cylinder with end pieces defining a closed pipe 1. There is a piston 2 therein dividing closed pipe 1 into two compartments with shaft 3 extended through the wall of an endpiece. O-ring 9 prevents the working fluid within the cylinder on both sides of piston 3 from leaking out. The working fluid is assumed here as water under pressure. Another shaft 4 is fixedly attached to closed pipe 1 through connection with the other endpiece. Two check valves 7,8 on either side of piston 2 allow access to the working fluid from the outside. Exit tubes 5,6 are made to allow the transfer of pressure to the rest of the invention. As the bulk modulus of elasticity of water is very high then in operation there will only be minimal movement of the piston. But as force is applied to the piston there will be caused a pressure differential on either side of the piston which will be transferred through tubes 5,6. In FIG. 2 we see tubes 5,6 again. Supports 15,16 contain machinery for converting pressure differentials into kinetic energy to operate a D.C. Generator 27.

Pipe 6 is made to open into the end of Bourdon tube 11 which is fixedly attached to support 15. The moveable end of Bourdon tube 11 is fixed to gear 12 axially mounted on shaft 14 and supported by supports 15,16. Meshing with gear 12 is gear 17 mounted on driveshaft 26. Pawl 10 is operatively attached to gear 17. Ratchet 19 is fixed to shaft 26. Supports 15,16 also is made to support shaft 25. Gear 18 with operatively attached pawl 22 is mounted on shaft 25. Ratchet 21 is fixedly attached to shaft 25. Ratchet 21 and pawl 22 are set to be made to operate in the opposite direction from ratchet 19 and pawl 10 operatively attached to gear 17. Axially attached to driveshaft 26 is gear 23 which is located to mesh with gear 29. which is axially attached to shaft 25. The working fluid for Bourdon tube 11 is assumed to be water. Fixedly attached to support 15 is closed pipe 13 which is made to enclose Bourdon tube 11. Closed pipe 13 is attached to a face of gear 12 by a slideable seal 13a so as gear 12 is made to revolve the working fluid in closed pipe 13 will be retained. Entry tube 5 is located to supply pressure to the working fluid within closed pipe 13.

In operation pressure variations on the working fluid in Bourdon tube 11 and closed pipe 13 causes gear 12 to be rotated back and forth. Due to the actions of the aforementioned gears 12,17,23,29 and ratchets 19,21 and pawls 10,22 driveshaft 26 is made to rotate in only one direction regardless of the direction gear 12 is made to rotate. Proper gear ratios increase the velocity of succeeding gear pairs. Driveshaft 26 thus is made to operate generator 27.

Figure 2:
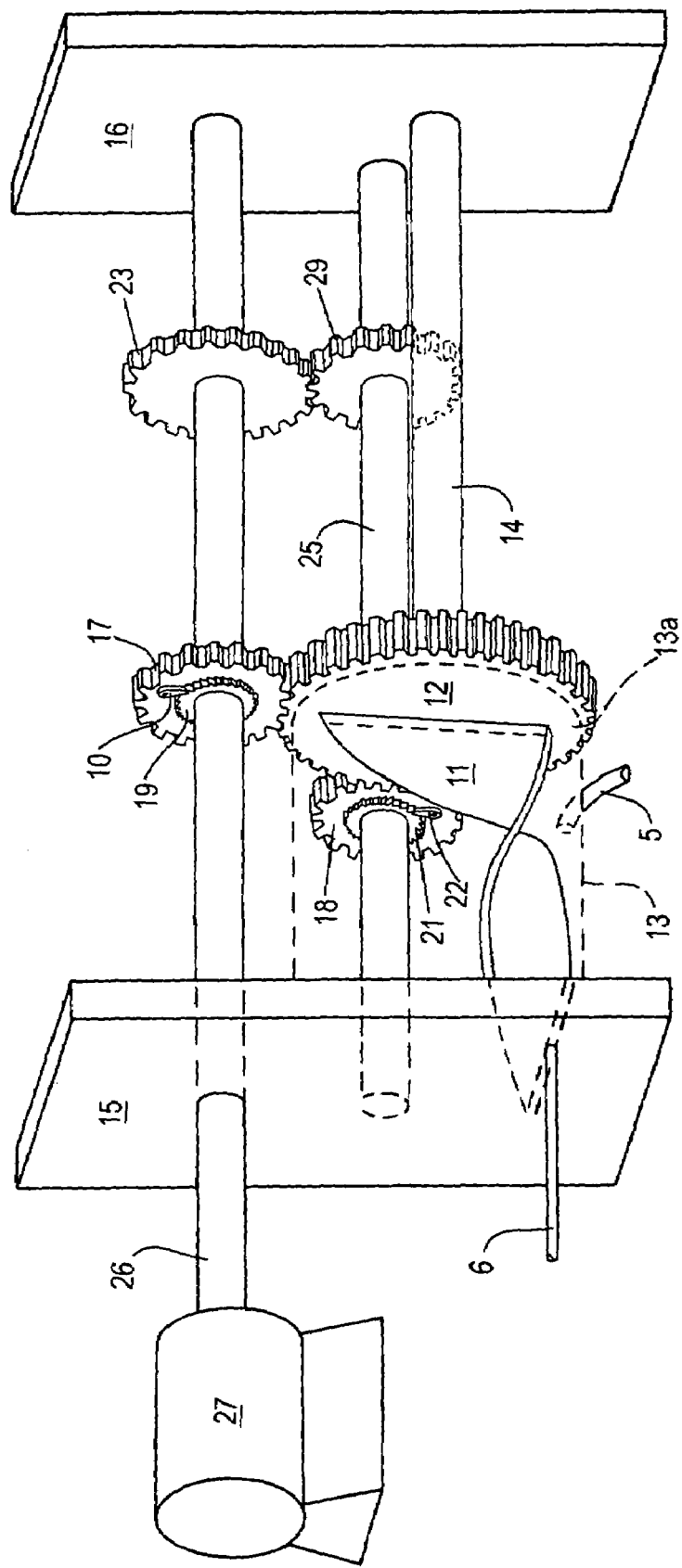
FIG. 2 is a perspective view of prior art showing a twist-type Bourdon tube operably connected to an electric generator.
Figure 3:
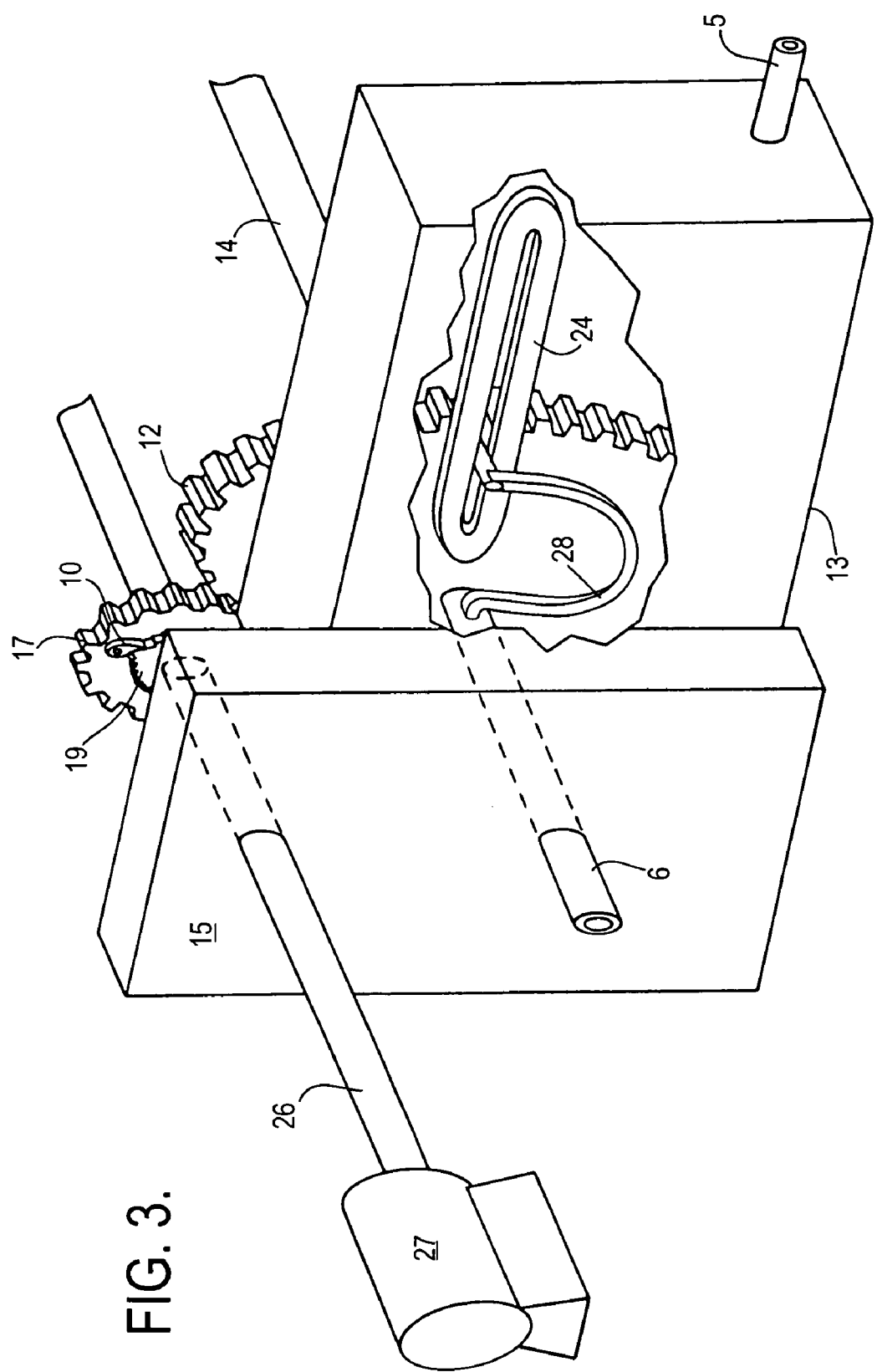
FIG. 3 is like FIG. 2 but substitutes a C-type Bourdon tube.

Turning to FIG. 3 we see the apparatus of FIG. 2 modified for a C-type Bourdon tube 28. On the moveable end of Bourdon tube 28 is a rod which is made to fit into Scotch Yoke 24 fixedly attached to gear 12. Regardless of which type of Bourdon tube is used if it is desired to increase the force on gear 12 then a plurality of Bourdon tubes can be attached to gear 12. A Possible arrangement for C-type Bourdon tubes is shown in U.S. Pat. No. 1,258,368.

Figure 4:
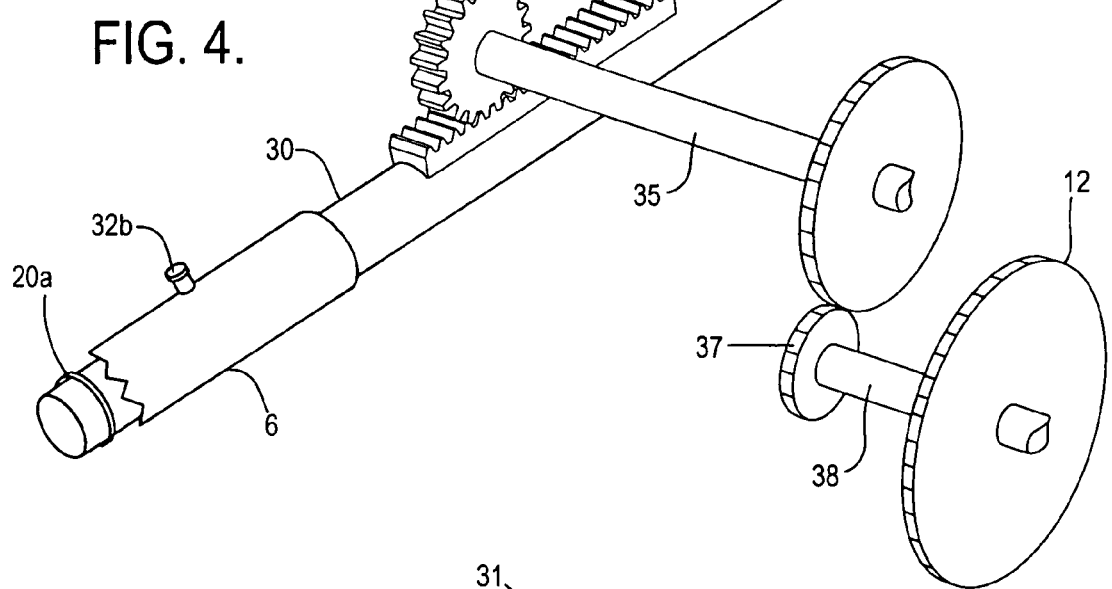
FIGS. 4, 4a. show perspective views of devices which are alternatives to using a Bourdon tube.

As an alternative to using Bourdon tubes another basic structure of the invention is presented. Referring to FIG. 4 we see tube 6 and gear 12 as before. No support structure is shown. On the same axis as tube 6 is a second tube 31 with a piston 30 on the identical axis and with each end inserted in tubes 6,31. Second tube 31 is closed at its far end. Tubes 6,31 are full of water. O-rings 20,a,b are located to prevent leakage from tubes 6,31. Fixedly attached to piston 30 between tubes 6,31 is gear rack 33 and pinion 34. Shaft 35 operatively connects pinion 34 and gear 36. Meshing with gear 36 is pinion 37. Shaft 38 is made to connect pinion 37 and gear 12. Capped fill spouts 32a,b are used to adjust the amount of water in tubes 6,31. In operation varying pressure on the water in tube 6 and hence tube 31 causes piston 30 to move back and forth causing gear 12 to move back and forth in response. Fill tubes 32a,b are used since the smaller the amount of water in tube 31 the less motion of piston 30 is possible. So the amount of travel for gear 12 is adjustable.

In the Eighth and Ninth Preferred Embodiments it will be seen that tubes 6,6a may be very long. Piston 30 may also be very long but of the same density as water and even largely fill tubes 6,6a. The smaller the amount of water in tubes 6,6a the less travel will be possible for gear 12. It should be noted that the diameter of tube 6 may be large where it is made to exit closed pipe 1 in FIG. 1 and smaller as it is made to enclose piston 30 in FIG. 4. This minimizes travel of piston 2 and maximizes travel of piston 30.

Figure 4A:
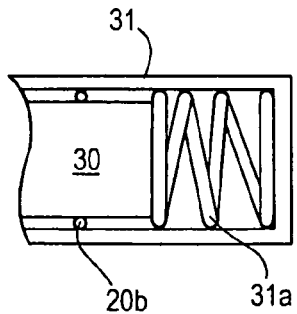

In FIG. 4a. we see a spring 31a. substituted for the working fluid in tube 31. Tube may be full of water and the steel walls of tube may be made to act as a spring.

The above basic structures are used with those preferred embodiments where the incoming pressure is not magnified. But in some preferred embodiments the incoming pressure may be magnified and the pressure variation must be artificially regulated to operate a generator. Thus a substitute structure for that shown in FIG. 1 must be installed. Examples of such a magnifyable input are wind and subsurface ocean currents.

Figure 5:
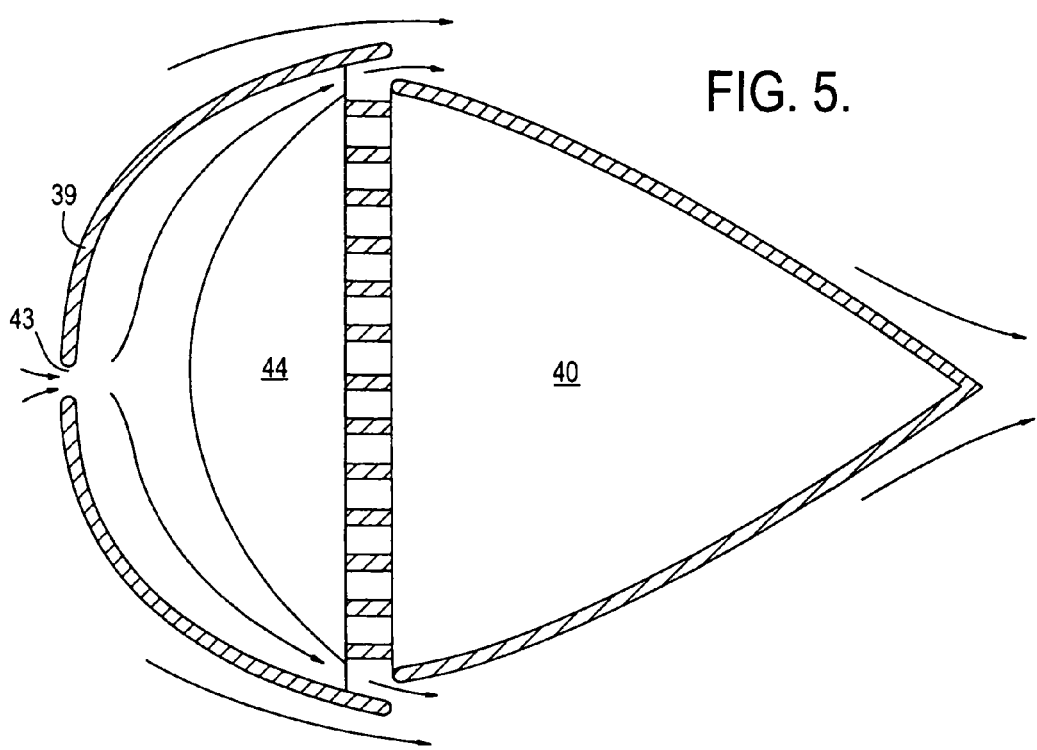
FIG. 5 shows a cross-section of a new type of diverging nozzle suitable for the invention.

Turning to FIG. 5 there is shown a cut-away section of a hollow dome 39 fixed to a hollow cone 40 by intermittent spacers 41 making space 42. There is shown hole 43 and a tube 6 whose open end lies near hole 43. A second hollow dome 44 is affixed to hollow dome 39 at its rim.

In operation, as working fluid passes around the tear-drop shape 39,40 some of this working fluid is pulled through hole 43 and out space 42 with secondary dome 44 serving as a further guide to the working fluid.

Figure 17:
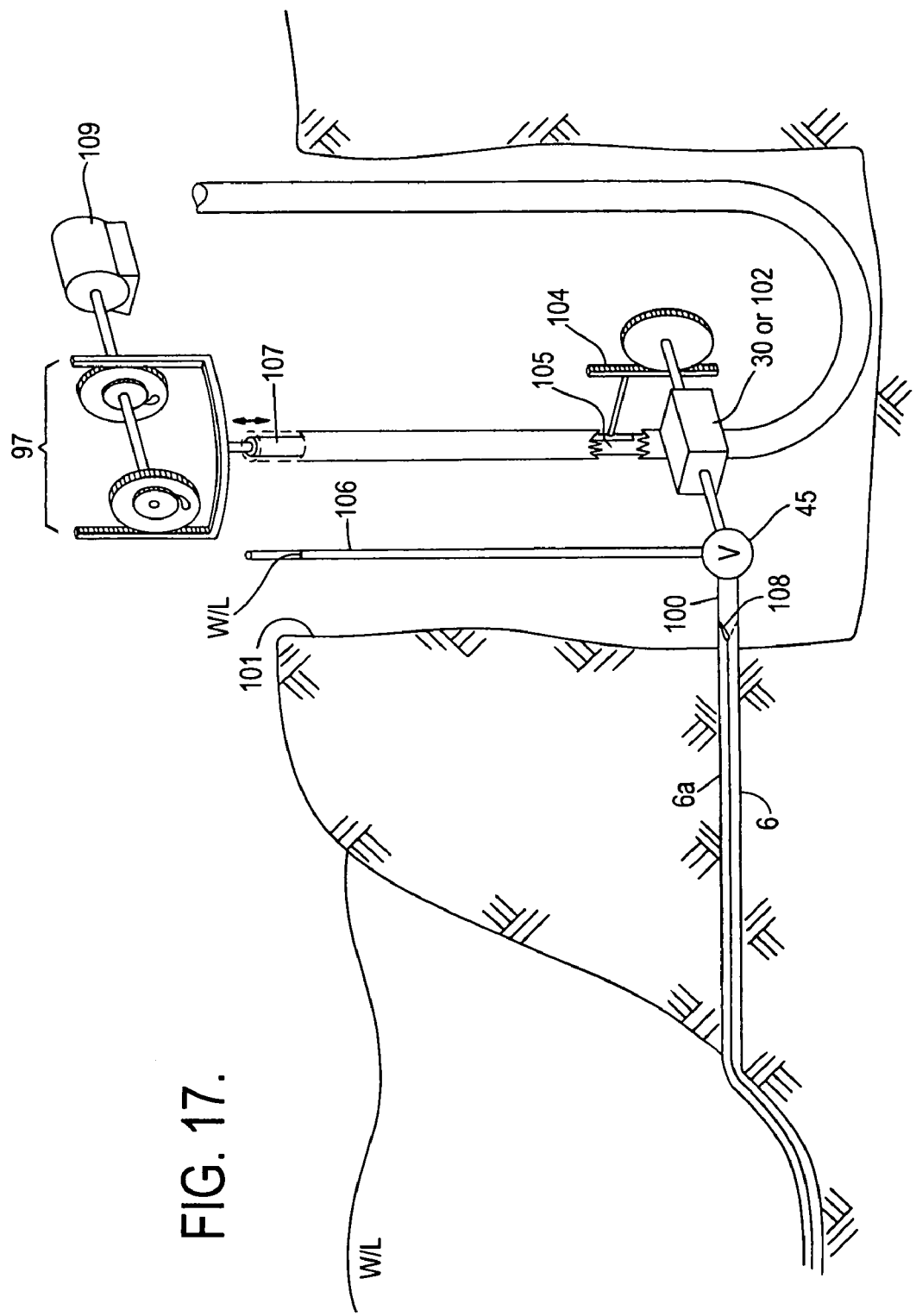
FIG. 17 is a cross-sectional view of the onshore apparatus of the application shown in FIG. 16.

Magnifying the energy input also magnifies the variation in input. To regulate the input, we turn to FIGS. 15, 17 to see valve 45 located so as to admit either reduced pressure from hole 43 or atmospheric pressure from tube 46 which is open to the atmosphere.

DETAILED DESCRIPTION OF THE PREFERRED EMBODIMENTS

First Preferred Embodiment

Figure 6:
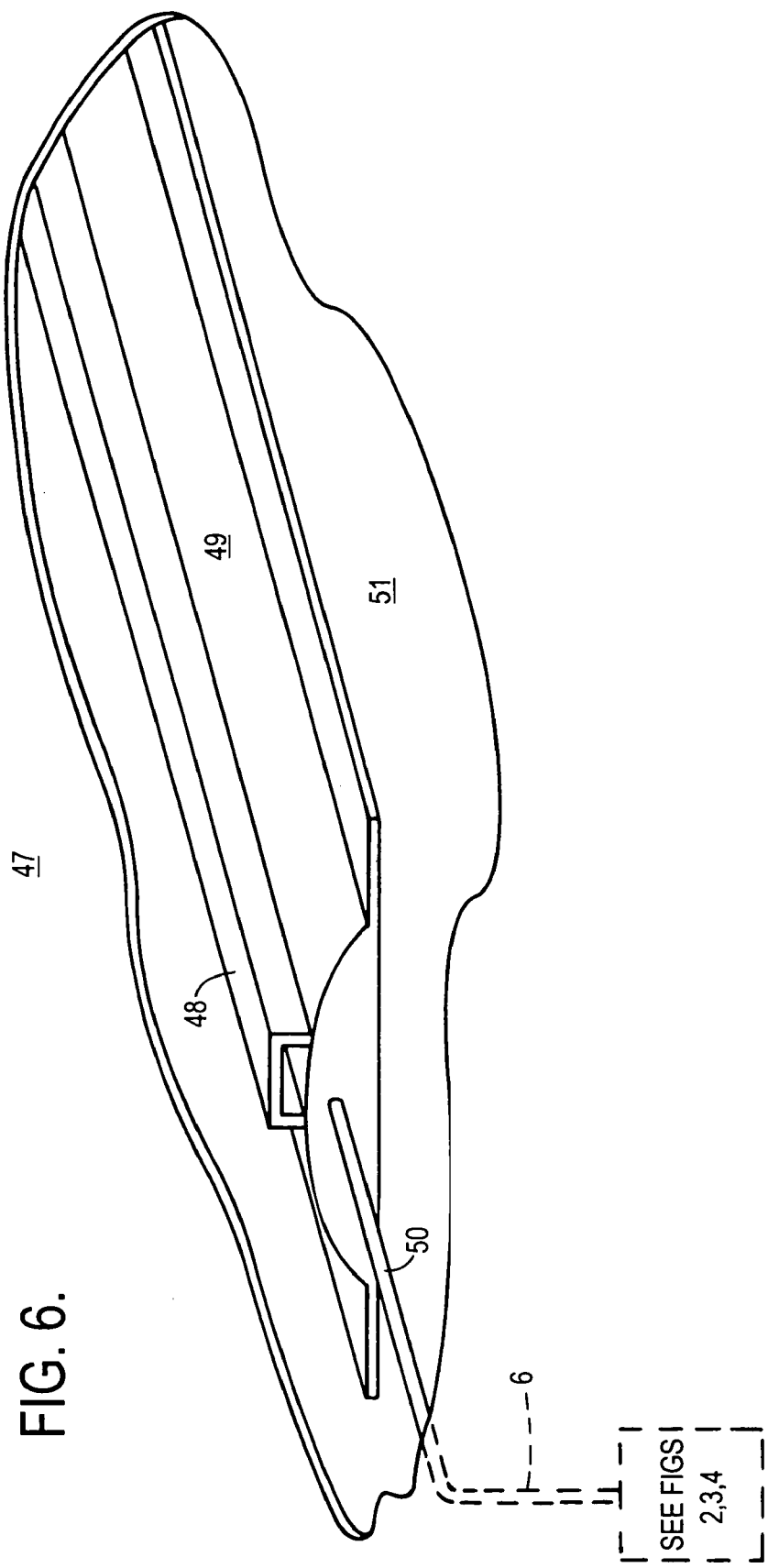
FIG. 6 shows how the invention converts the live load on a roadway into electrical energy.

FIG. 6 shows an asphalt roadway 47. Buried under the roadway is a stainless steel chamber completely filled with water 49. On top of chamber 49 is stainless steel channel 48 with both legs rested on the top surface of chamber 49. Tube 50 led from chamber 49 is joined to tube 6 to supply pressure variations to Bourdon tube 11 or piston 30. Item 51 denotes the normal underfill of a roadway.

In operation, as vehicles or people traverse the roadway pressure variations on chamber 49 cause electric power to be produced with minimal displacement of the asphalt.

Second Preferred Embodiment

FIG. 7 shows pole 52 in two sections with rotateable joint 53 between them. Affixed to the upper section is sail 54. The surface of this sail can be painted with a design. Pole 52 is extended a short distance below ground level, shown in FIG. 7a. Concrete form 55 is formed to form a pivot for pole 52 and to contain certain conversion machinery as in FIG. 2, 3 or 4. Joint 56 fixes piston shaft 2 to pole 52 through wall 57. Piston 3 is within water-filled cylinder 1. Exit tubes 5,6 are shown and are led to Bourdon tube 11 and closed pipe 13 as previously noted, or piston 30.

The wind velocity is always variable unless there is a hurricane. In operation varying pressure on sail 54 causes pole 52 to sway and act as a lever, activating the conversion machinery and producing electricity. Instead of a sail 54, pole 52 may be connected to a tree which would act as a sail 54. See FIG. 18. Another way is to substitute a tall building 58 for sail 54, connecting pole 52 to the top of the building framework. See FIG. 8. Another similar alternative is shown in FIG. 9. Here, pole 52 is a mast on a sailboat. The rest of the invention is installed inside the hull. For running rigging 59 and standing rigging 60 the machinery shown in FIG. 1 is used instead of the machinery in FIG. 7a. In operation, as wind presses on the sails of the sailboat electrical energy is supplied to a battery for auxiliary power Substituting a battery for ballast is prior art.

Within the scope of this embodiment the pole 52, joint 53 and sail 54 may be affixed to the bottom of an ocean to collect the pressure energy of subsurface ocean currents. Tubes 5,6 may be extended to shore and the rest of the conversion machinery located ashore. See also FIG. 17.

Third Preferred Embodiment

In FIG. 10 we see a container within a vehicle of some weight 61. This container 61 is enclosed by another container 62 fixedly attached to the framework of a vehicle. Between these containers are a number of structures as in FIG. 1. Shaft 4 is fixedly attached to container 62, and shaft 3 is mace to terminate as a ball bearing 63 which is made to ride on the outer surface of container 61.

In operation, as the mass of container 61 and its contents acquire a different momentum than the vehicle frame due to the impact of live loads the machinery of the invention is activated to convert pressure energy into electrical energy. The contents of container 61 may be fuel, a battery, or cargo.

Fourth Preferred Embodiment

Figure 11:
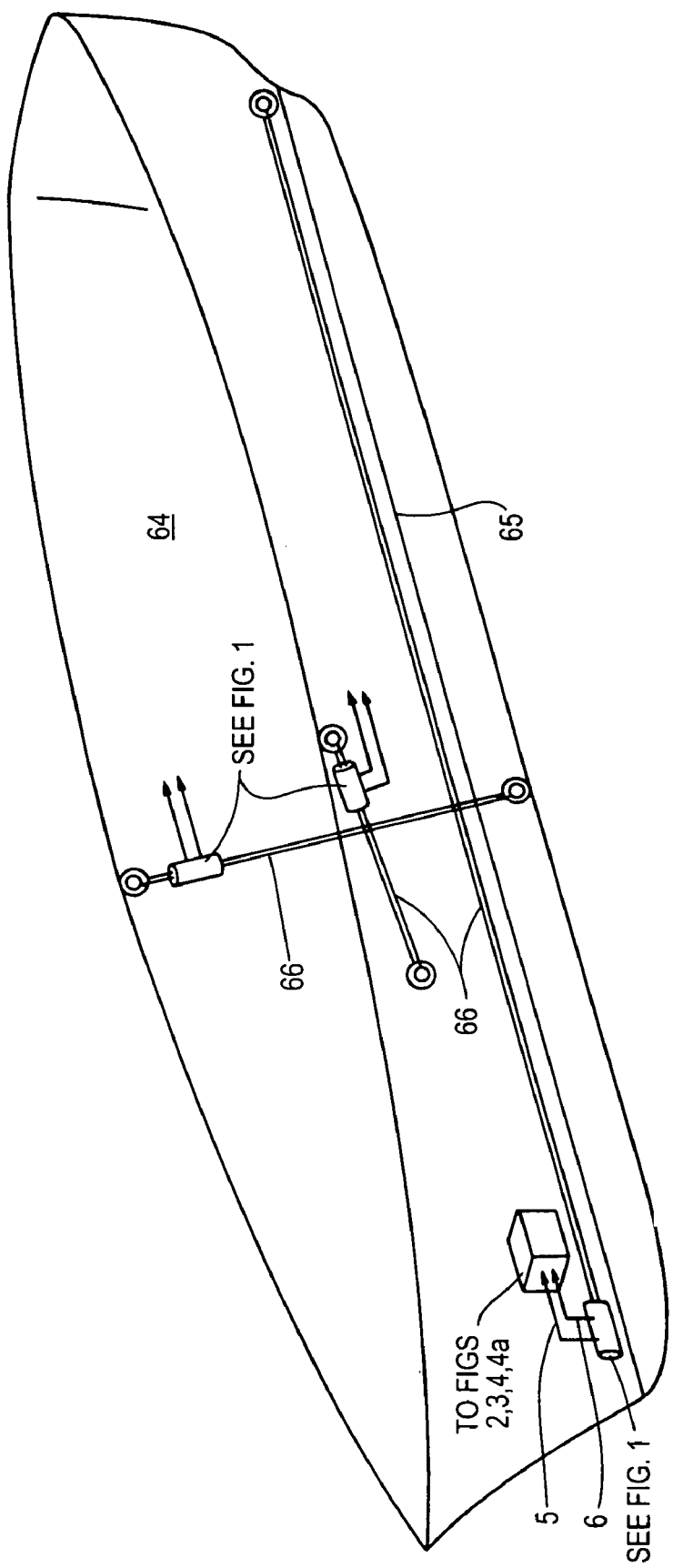
FIG. 11 is a perspective view showing how a ship's hull may be used with the invention to produce electricity.

In FIG. 11 we see the hull of a ship 64 with a keel 65 and cables 66. A machine as in FIG. 1 has its shaft 4 attached to a cable 66 and its shaft 3 attached to the hull framing.

In operation, as hull 64 is made to hog or rack the appropriate cables 66 are stretched, activating the conversion machinery of the invention to produce electrical energy. These cables will substitute for some of the usual stiffening structure of hull 64.

Fifth Preferred Embodiment

Turning to FIG. 12 we see a bridge 67 suspended by cable 68 from suspension cable 69. A second cable 70 is attached to cable 68 at cable 68 top 71 and bottom 72 so as cable 68 is stretched second cable 70 is stretched also. This second cable 70 is installed so the bridge doesn't have to undergo extensive retrofitting. Cable 70 is divided into two sections united by the conversion machinery of FIG. 1–4 as the user requires.

In operation, as cable 70 is stretched and alternately relaxed by the passage of live loads on bridge 67 the conversion machinery is activated, producing electrical energy.

Sixth Preferred Embodiment

Figure 13:
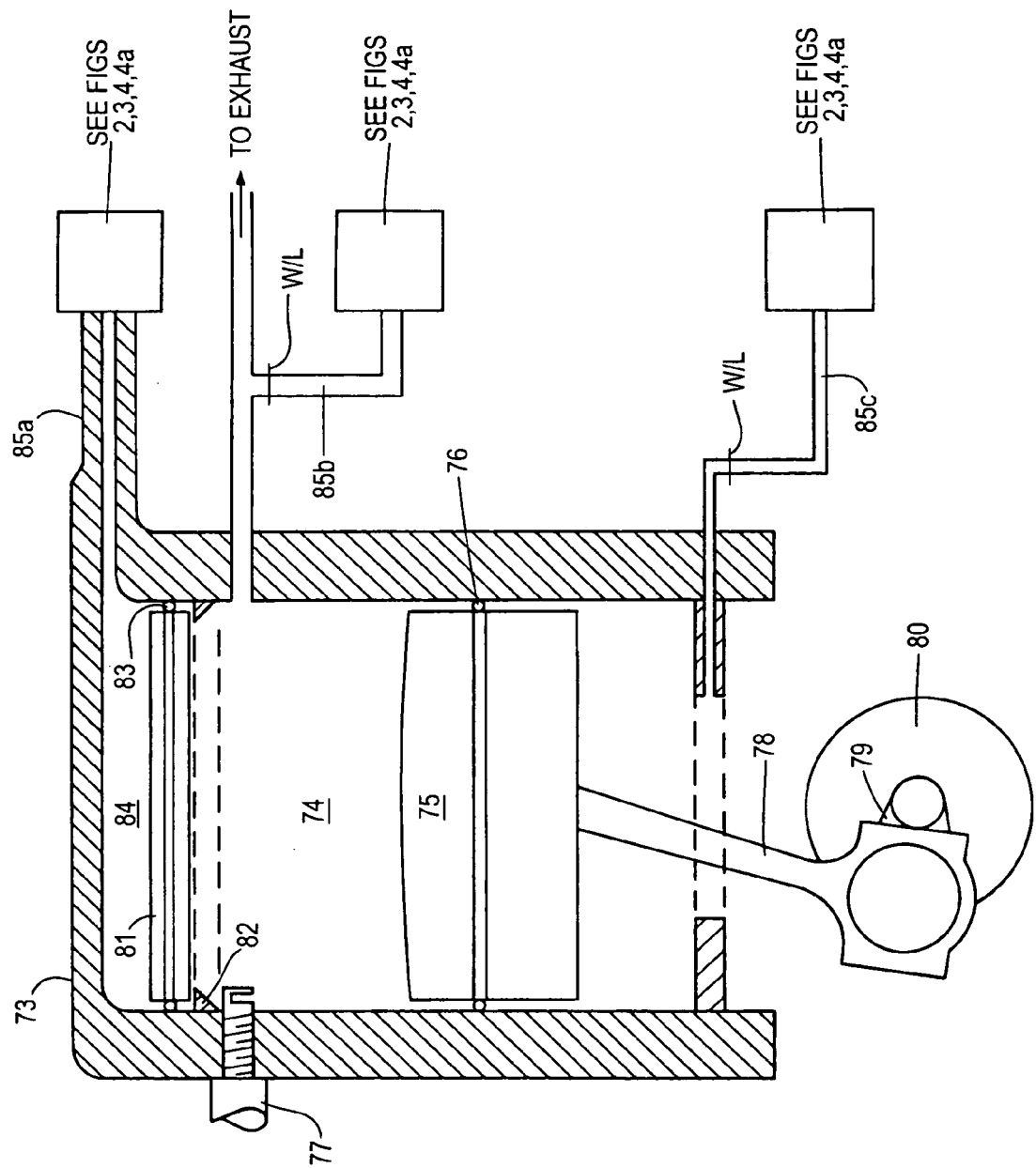
FIG. 13 is a cross-sectional view showing how an internal combustion engine may be used with the invention to produce electrical energy.

Referring to part of FIG. 13 and all of FIGS. 3, 4 we see piston cylinder 73 of an internal combustion engine. There is shown combustion chamber 74, piston 75, piston ring 76, spark plug 77 piston shaft 78, cam 79 and crankshaft 80, all in their usual arrangement. Plate or secondary piston 81 is made to rest on shelf 82. There is shown O-ring 83 which serves the same function as piston ring 76. Water chamber 84 as well as tubes 85a,b,c are completely full of working fluid. Slot 118 is also shown. In operation, as piston 75 is made to move Up and dorm pressure in chamber 84 is made to vary. By the Bernouilli Effect pressure in tubes 85b,c is also made to vary, operating the conversion machinery shown in FIGS. 2, 3, 4.

In addition through the use of the Bernouilli Effect and within the confines of this Sixth Preferred Embodiment the operation of an elevator can be made to produce an auxiliary amount of electrical energy. In FIG. 14 we see an elevator car 85 supported by cable 86 which is led around pulleys 87,88 to counterweight 89. Tube 90 is closely fitted around elevator car 85 and serves as a piston cylinder to elevator car 85 which serves as a piston. Tube 90 is narrow at either end. O-rings 91 serve the same function as piston rings. Pipes 6a,b transmit pressure differences either to Bourdon tube 11 or piston 30.

In operation, as counterweight 89 is made to move up an down at different rates of speed, pressure differences are transmitted as noted.

Seventh Preferred Embodiment

Figure 15:
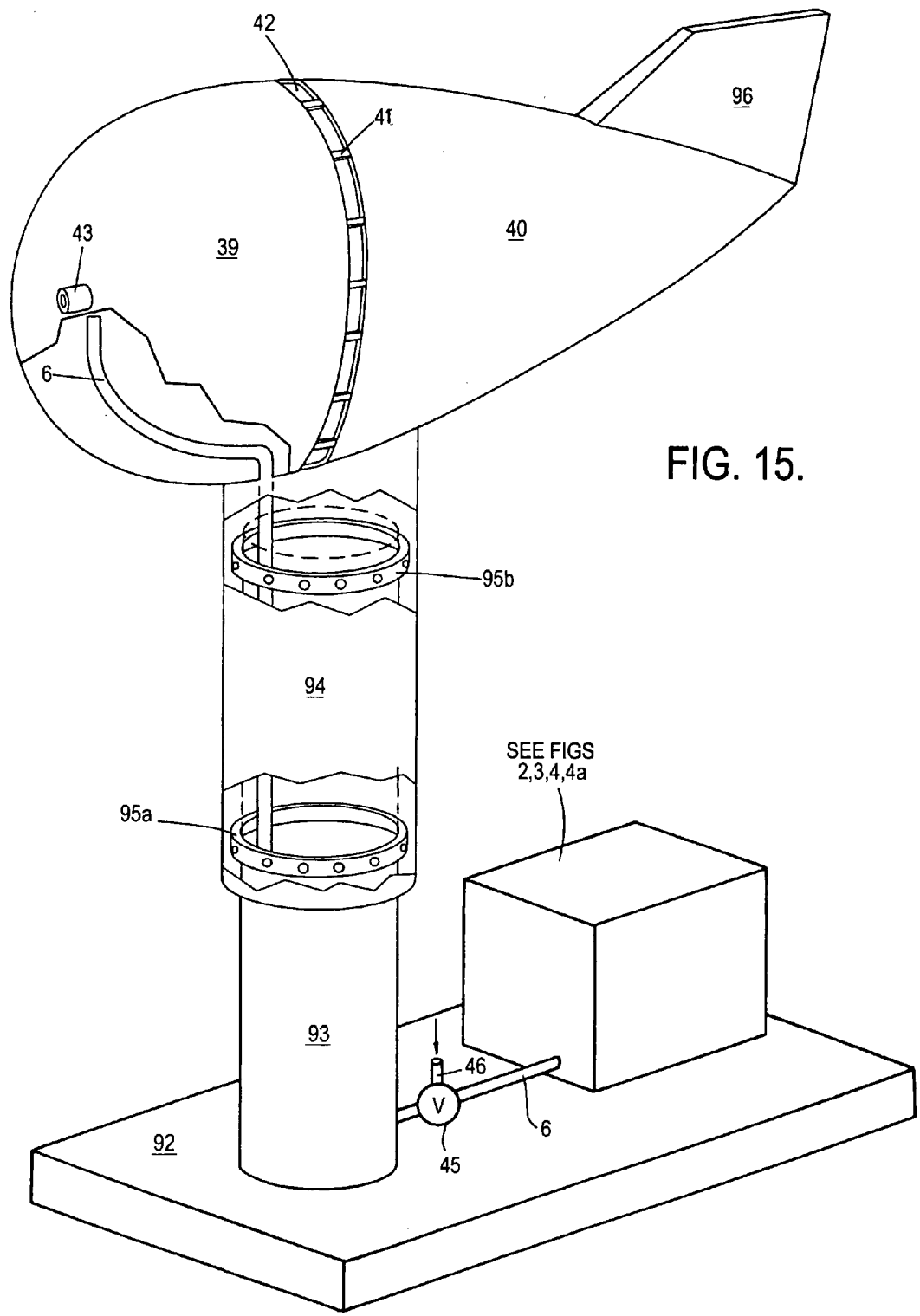
FIG. 15 is a perspective view showing how the invention may be used to convert wind energy into electricity.

This regards applying the invention to converting wind energy into electrical energy in a way different from the Second Preferred Embodiment. In FIG. 15 we see the apparatus of FIG. 5 mounted on base 92, tube 93 and telescoped tube 94. The suface of the apparatus of FIG. 5 can be painted with design. Thrust bearings 95a,b allow the apparatus to be rotated according to wind direction by rudder 96. Regulating valve 45 is a three way valve admitting either reduced pressure from hole 43 or atmospheric pressure from tube 46 to Bourdon tube 11 or piston 31. Tube 46 is open at its top.

In operation, passing wind causes Bourdon tube 11 or piston 30 to be alternately pressurized and depressurized, causing electrical energy to be produced.

Eighth Preferred Embodiment

Figure 5A:
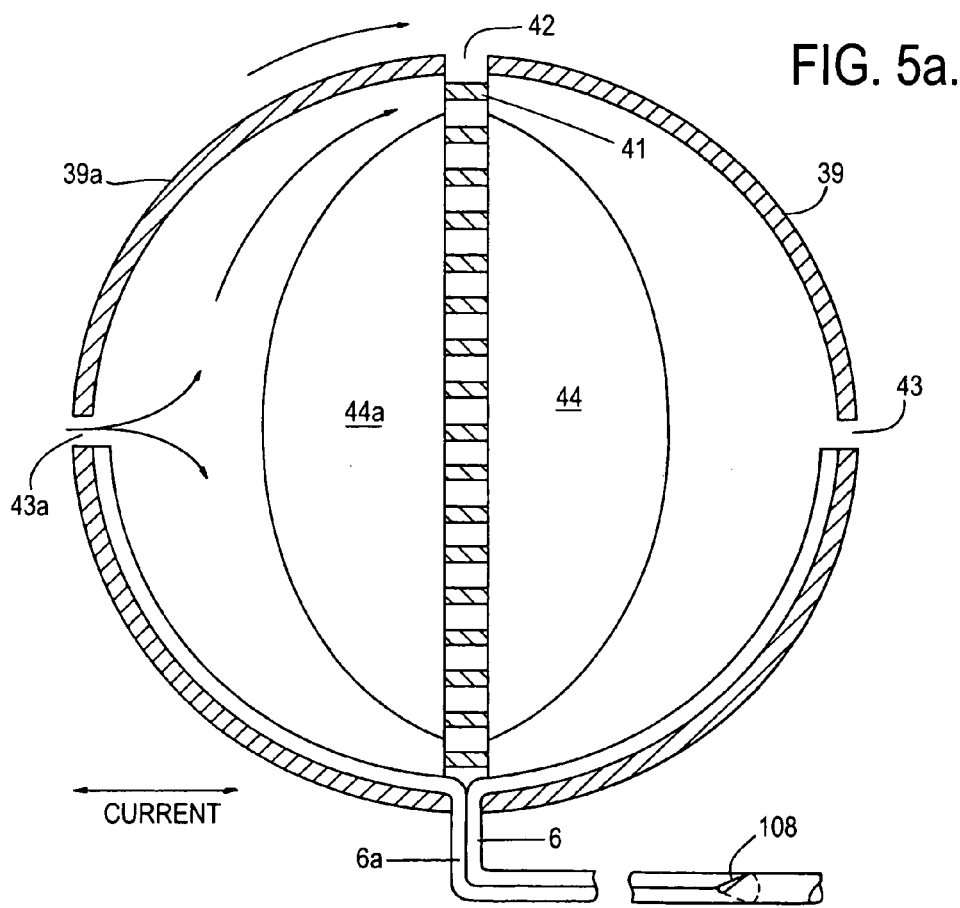
FIG. 5a shows a modified version of this diverging nozzle.
Figure 16:
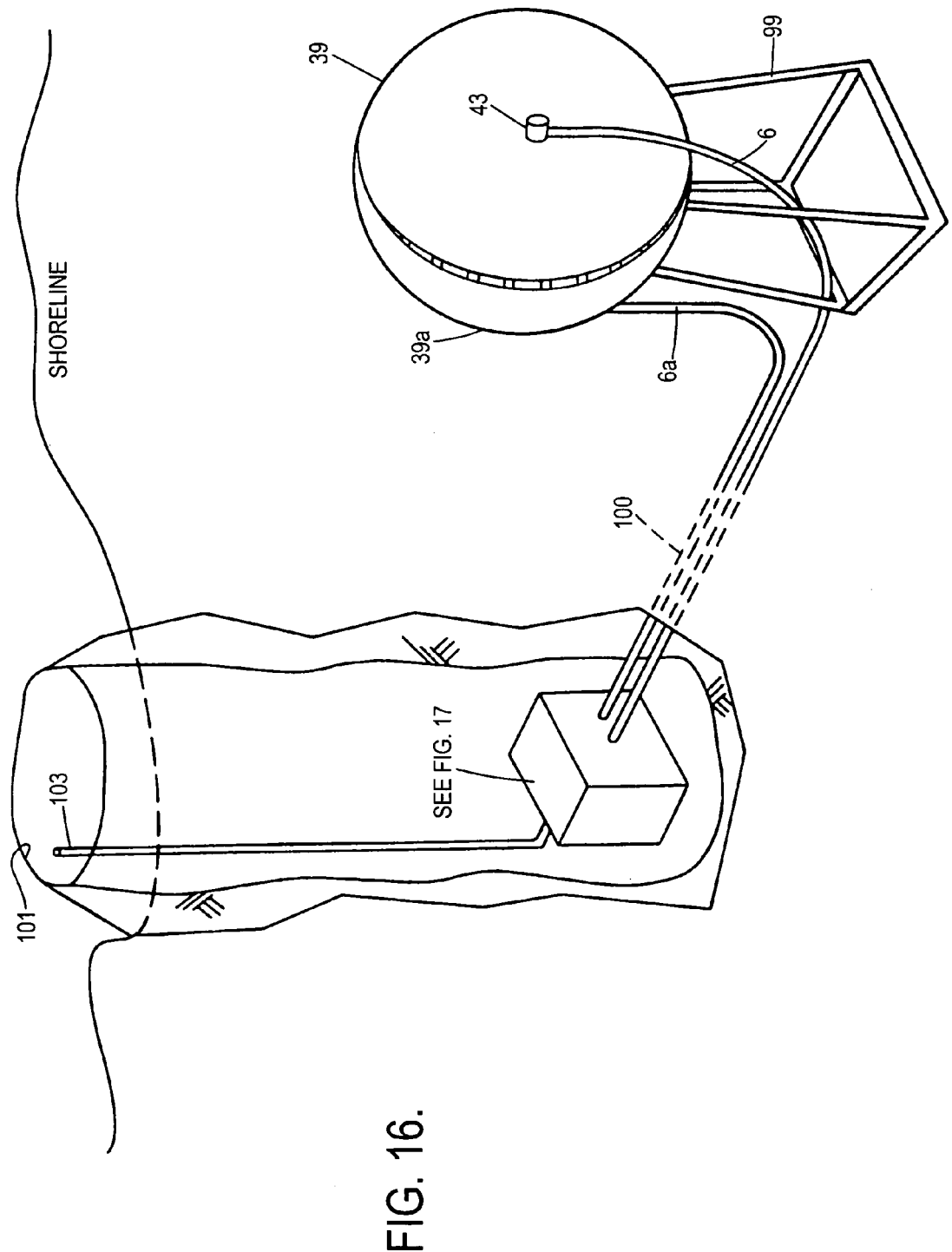
FIG. 16 shows a perspective view of how the invention can convert the energy of subsurface ocean currents into electricity.

In this Embodiment there is shown (FIGS. 16, 17) how to apply the invention to convert the energy of subsurface ocean currents into electrical energy. The apparatus of FIG. 5a is used instead of the apparatus of FIG. 5 so there will be no need to revolve the apparatus which lies on the ocean bottom. Thus there are no moving parts below the waterline. Valve 108 is to be operated depending on which way the current is flowing and is ashore.

Support 99 supports the apparatus of FIG. 5a on the bottom of the ocean so holes 43,43a are made to face an oncoming current which may change direction 180 degrees. Pressure energy in pipe 100 is correspondingly reduced at its end at the bottom of excavation 101 when three-way valve 45 is opened.

Valve 45 is made to alternately open and close pipes 6,6a as the invention is designed to convert pressure variations into electricity.

Pipes 6,6a. a are led into an onshore excavation 101 and, past valve 45 are jointly made to end horizontally as Bourdon tube 102 or piston 30. Three-way valve 45 may be revolved and pressure from tube 103 alternates with the pressure in pipe 6,6a.

This operates rack 104 and piston 105. U-tube 106 is full of water. Piston 107 is thus made to operate the racks of mechanical converter 97 as described in U.S. Pat. No. 25,550 thus operating generator 109 in a single direction. It should be pointed out that the structure of mechanical converter 97 is parallel to the structure taught by U.S. Pat. No. 25,550 in that there will be output regardless of the pressure differences involved. To continue, In FIG. 17 we see one leg of the U-tube 106 is longer than the other. This is to counterweight piston 107 and structure 97 with the water in the higher leg.

Because the pressure differences in the Seventh Preferred Embodiment may be small the volume of water or other working fluid in chamber 31 will be large relative to the size of piston 30 so the travel distance of piston 30 is conveniently increased.

Ninth Preferred Embodiment

Figure 19:
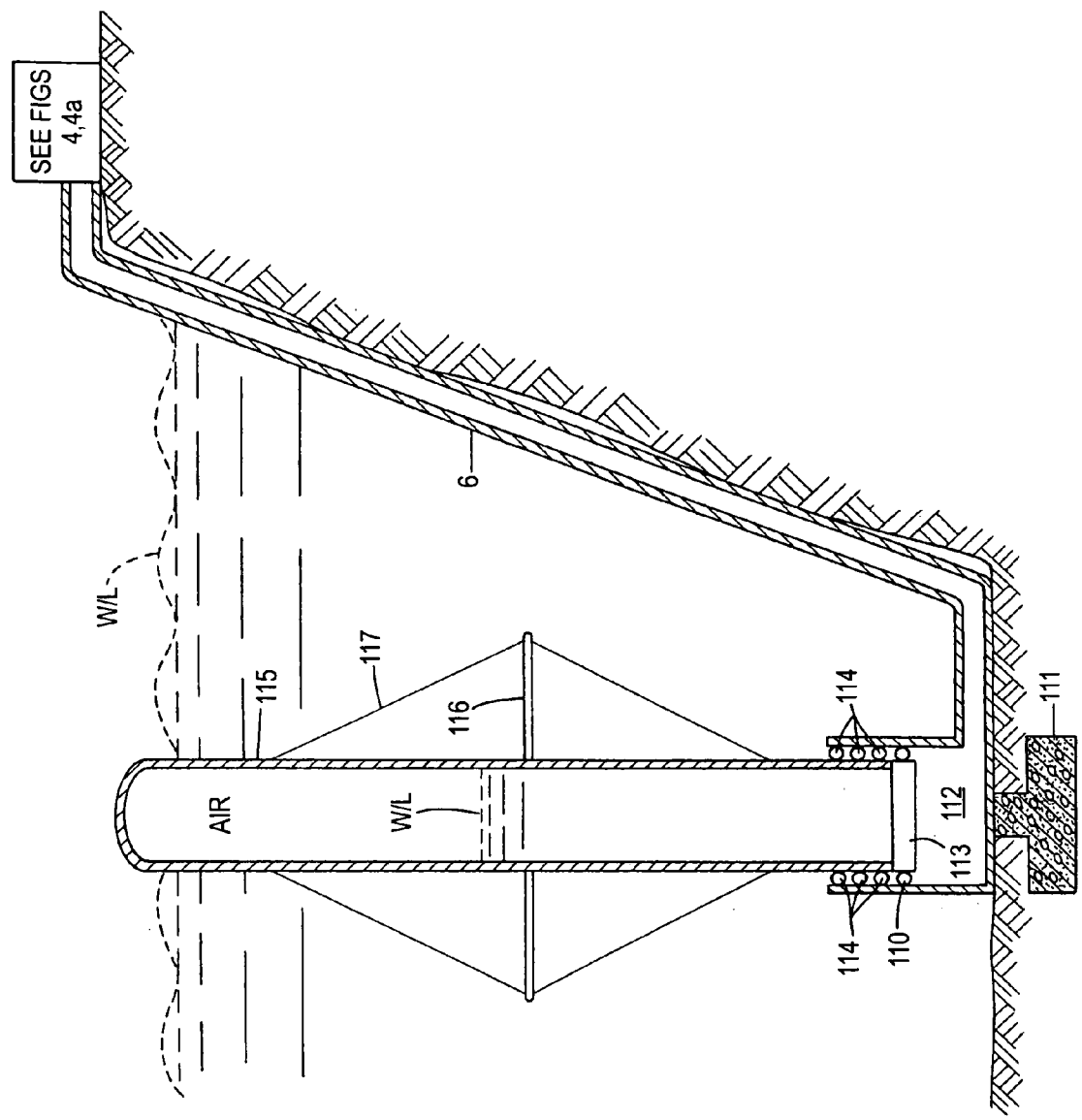
FIG. 19 is a cross-sectional view showing how the invention may be used in connection with a prior art off-shore device to convert wave energy into electricity.

This regards converting ocean wave energy into electricity. Turning to FIG. 19 we see tube 6 as a pipe from an offshore structure to an onshore structure as shown in FIGS. 4, 4a. Tube 6 is led from upright cylinder 112 rested on the ocean bottom which is mounted on base 111. Closed cylinder 115 contains enough of an air bubble to make it neutrally buoyant. O-ring 110 is between the rim of piston 113 and upright cylinder 112 which serves as a piston sleeve. Fixedly attached to the top of piston 113 is closed cylinder 115. Struts 116 are made to extend from the rigid wall of cylinder 115 horizontally and are stiffened by standing rigging 117 which is anchored to top and bottom portions of the vertical wall of cylinder 115 to stiffen the wall.

In operation, surface waves cause buoyant cylinder 115 to tend to move up and down. Moved downwards, pressure in pipe 6 is increased as piston 113 is made to tend to move downwards. If cylinder 115 is made to tend to move upwards pressure in pipe 6 is decreased. This reciprocal action operated electrical generator 27 ashore.

The structure of this embodiment follows U.S. Pat. No. 6,781,253 but is meant to be used in the present invention with the onshore structure of FIG. 4, 4a. which ideally should be placed at sea level.

From the above description it is apparent that the preferred embodiments acheive the objects of the present invention. Alternative embodiments and various modifications of the depicted embodiments will be apparent to those skilled in the relevant arts.

What is claimed is:

1. A system of devices for converting the energy of a live load into electrical energy comprising:
  a. a pressure receiver means selected from the group of
    (1) a flexible pole extended vertically from ground level with a sail affixed atop said pole, said pole selected from the group of
      (a) a tree support,
      (b) a mast of a sailboat, and
      (c) a building framework, and
    said sail is selected from the group of
      (a) a tree,
      (b) a sail of a sailboat, and
      (c) a building, accordingly,
    (2) a suspension cable of a bridge,
    (3) a cable stretched along the top of a keel of a ship,
    (4) a container of weight in a vehicle and attached thereto,
    (5) a road surface, and
    (6) a hollow dome means fixed to a hollow cone means,
  b. a pipe means operatively connected to said pressure receiver means, said pipe means selected from the group of
    (1) a closed pipe means selected from the group of:
      (a) a pipe whose first end is operatively connected to a live load and whose second end contains a piston, said piston made to extend through one end of a second closed pipe and to which a gear rack is affixed and made to mesh with a gear of an energy conversion device, said second closed pipe selected from the group of:
        ((1)) a container filled with liquid working fluid, and ((2)) a container containing a spring means operatively connected to said piston, (b) a piston means comprising ((1)) a piston sleeve closed on both sides defining the walls of a container of liquid working fluid ((2)) a piston within said sleeve dividing said sleeve into two compartments, ((3)) a piston shaft fixedly attached to said piston and extending through an end wall of said sleeve, ((4)) liquid working fluid completely filling both said compartments, ((5)) O-rings between said sleeve and said wall and between said piston and said sleeve to prevent said leakage of said liquid working fluid, ((6)) check valves through the walls of each said compartment to allow each said compartment to be filled with liquid working fluid, and ((7)) an exit tube from each compartment so as said piston shaft is made to push on and pull on said piston, fluid pressure in each said compartment and said exit tube is varied accordingly, and (c) a liquid-filled chamber located next to a combustion chamber of an internal combustion engine, said closed pipe means having a moveable wall separating said container filled with working fluid from said combustion chamber so as said engine's piston is operated pressure is made to vary on said working fluid within said container filled with working fluid and operate an open pipe means, and (2) an open pipe means selected from the group of (a) an exhaust pipe of an internal combustion engine operatively connected to a closed pipe means, (b) a slotted wall within said piston's cylinder of said internal combustion engine through which said piston's shaft is made to move, the movement of said piston causing the velocity of air to move through said slot at a varying rate, a closed pipe means operatively connected to said slotted wall so pressure is varied in said closed pipe means, (c) a narrow necked piston cylinder containing an elevator car operated as a piston within a piston cylinder operably connected to a closed pipe means, and c. an energy conversion means comprising a gear means transmission operatively connected to said pipe means, and an electric generator operatively connected to said gear means transmission, so said live load is made to operate said electric generator.

2. A system of devices of claim 1 wherein said pressure receiver means is said hollow dome means fixed to said hollow cone means forming a diverging nozzle means, said pipe means is said closed pipe means comprising said piston means, and a tube has a first end operatively connected said diverging nozzle means, said diverging nozzle means further comprises:

a. said hollow cone means fixedly attached to said hollow dome means along their respective rims, said rims being spaced apart and being connected intermittently by suitable means, c. an inner wall means within said diverging nozzle means to guide a flow of fluid through said space between said rims, and d. a hole means in the center of said hollow dome means oriented so said hole means is parallel to the earth's surface so as passing fluid is made to draw other fluid through said space defined by said rims, fluid is drawn through said hole means at a greater velocity than said passing fluid's velocity and is located next to said tube.

3. The system of devices of claim 2 wherein said diverging nozzle means working fluid is air and said second end of said tube is operatively connected to said piston means, said piston means operatively connected to a three-way valve, a first inlet of said valve being said tube, a second inlet of said valve open to atmospheric pressure, and an outlet of said valve operatively connected to said piston means so as said air passes an electric generator is made to rotate then electricity is produced.

4. The system of devices of claim 2 wherein said diverging nozzle means' working fluid is water, said cone means is a dome means and wherein said diverging nozzle's tube's second end is operatively connected to a power conversion device comprising:

a. a vertically disposed U-tube full of water, b. a first piston within said U-tube and fixedly attached to a gear rack and operated by a said hydraulic means located near the lowest point of said U-tube and operatively connected to a pinion gear, c. a second piston within the end of a leg of said U-tube, d. a double rack and pinion means, each rack and pinion means operably connected to said piston within said leg, e. a three way valve whose first inlet is operably connected to said tube, a second inlet of said valve open to pressure from water surrounding said power converting apparatus, and an outlet of said valve operably connected to said hydraulic means, and f. generator means operably connected to said pinions of said double rack and pinion means, so that operating said three way valve will cause said first piston to be moved reciprocally and operate said device to cause electricity to be produced by said generator.

5. The system of devices of claim 4 wherein said power conversion apparatus is located in a hole ashore as deep as said diverging nozzle hole is located offshore.

6. The system of devices of claim 1 wherein said energy conversion means further comprises: a C-type, Bourdon tube and whose inlet end fixedly attached to a said gear means transmission comprising a fixed support upon which is mounted a first shaft and a first spur gear and whose other end is affixed to a moveable cylinder located as part of a scotch yoke affixed to said first spur gear in a radial direction, said Bourdon tube and said scotch yoke located in a closed pipe filled with working fluid with an inlet opening, said closed pipe's dimensions partially defined by said first spur gear face to which said Scotch Yoke is attached through a rotatable seal so as said first spur gear is made to rotate said closed pipe doesn't rotate, a second spur gear mounted on a second shaft, said second gear made to mesh with said first gear, and having mounted on it concentrically a ratchet and pawl in a first direction and a third spur gear mounted on said second shaft, a forth spur gear made to mesh with said first gear and mounted on said fourth gear concentrically a ratchet and pawl mounted in an opposite direction from said first ratchet and pawl, said fourth gear mounted on a transmission so as pressure is put upon said piston said gear is made to move.

7. The system of devices of claim 1 wherein said pipe means is said closed pipe means comprising said container filled with liquid working fluid located beneath a road surface and further comprises a steel channel whose legs are in contact with said container's top surface with the other ends of said legs in contact with said road's asphalt surface so as said vehicle is made to move over said channel pressure on said liquid working fluid within said container is made to vary and drive said electric generator.

8. The system of devices of claim 1 wherein said live load is produced by ocean waves operatively connected to said closed pipe means.

The above changes to the claims have been made to cancel rejected claims and add new claims that more clearly claim the invention.

* * * * *